: US 6,991,673 B2
: Jan. 31, 2006

(12) United States Patent
Wastijn et al.

(54) FILTER ELEMENT

(75) Inventors: Koen Wastijn, Deerlijk (BE); Willy Marrecau, Rome, GA (US); Geert Devooght, Koekelare (BE)

(73) Assignee: N.V. Bekaert S.A., Zwevegem (BE)

( * ) Notice: Subject to any disclaimer, the term of this patent is extended or adjusted under 35 U.S.C. 154(b) by 209 days.

(21) Appl. No.: 10/470,677

(22) PCT Filed: Jan. 31, 2002

(86) PCT No.: PCT/EP02/01160

§ 371 (c)(1),
(2), (4) Date: Sep. 4, 2003

(87) PCT Pub. No.: WO02/063148

PCT Pub. Date: Aug. 15, 2002

(65) Prior Publication Data

US 2004/0050023 A1    Mar. 18, 2004

Related U.S. Application Data

(60) Provisional application No. 60/265,907, filed on Feb. 5, 2001.

(51) Int. Cl.
   *B01D 46/00*    (2006.01)

(52) U.S. Cl. .......................... 95/273; 95/278; 55/282.3; 55/385.3; 55/482; 55/483; 55/484; 55/486; 55/502; 55/510; 55/521; 55/523; 55/527; 55/DIG. 10; 55/DIG. 30; 60/311; 210/493.2; 210/493.5; 210/494.2

(58) Field of Classification Search ............... 55/282.2, 55/282.3, 385.3, 482, 483, 484, 486, 487, 55/510, 521, 523, 524, 525, 527, 502, DIG. 5, 55/DIG. 10, DIG. 30; 60/311; 210/483, 210/493.1, 493.2, 493.5, 494.2, 496; 95/273, 95/278

See application file for complete search history.

(56) References Cited

U.S. PATENT DOCUMENTS

| 3,857,688 A | * | 12/1974 | Wisnewski .................... 55/502 |
| 4,199,387 A | | 4/1980 | Hladik |
| 5,395,039 A | * | 3/1995 | Koehler et al. ............. 210/496 |
| 5,454,845 A | * | 10/1995 | Anahara et al. .............. 55/523 |
| 5,733,452 A | * | 3/1998 | Whitlock ...................... 55/510 |
| 5,800,790 A | | 9/1998 | Imamura et al. |
| 6,096,212 A | * | 8/2000 | Quick et al. ................. 210/496 |
| 6,572,682 B2 | * | 6/2003 | Peter et al. ................. 55/282.3 |

(Continued)

FOREIGN PATENT DOCUMENTS

WO    WO 97/04152 A1    2/1997

(Continued)

*Primary Examiner*—Jason M. Greene
(74) *Attorney, Agent, or Firm*—Foley & Lardner LLP

(57) ABSTRACT

A filter element comprises a pleated metal fiber fleece being pleated according to pleating lines providing an edge with pleat openings to be closed in order to make gas flowing through the metal fiber fleece. The filter element further comprises at least two flanks, each of these flanks comprising a stiff material layer. The stiff material layer and the metal fiber fleece are connected using a layer of ceramic adhesive, which prevents direct contact of the metal fiber fleece over the length of the edge of the metal fiber fleece with the flank. Meanwhile the flanks, being essentially perpendicular to the pleating lines, closing the pleat openings in order to prevent bypasses.

62 Claims, 5 Drawing Sheets

U.S. PATENT DOCUMENTS

| | | |
|---|---|---|
| 2003/0196419 A1 * | 10/2003 | Peter et al. ................. 55/282.3 |
| 2004/0040268 A1 | 3/2004 | Wastijn et al. |
| 2004/0050022 A1 | 3/2004 | Marrecau et al. |
| 2004/0131511 A1 | 7/2004 | Marrecau et al. |

FOREIGN PATENT DOCUMENTS

| | | | |
|---|---|---|---|
| WO | WO 99/12629 A1 | | 3/1999 |
| WO | WO 00/00721 | * | 1/2000 |
| WO | WO 02/057000 A1 | | 7/2002 |

* cited by examiner

FILTER ELEMENT

FIELD OF THE INVENTION

The present invention relates to filter elements, which may be regenerated electrically. More specific, the invention relates to filter elements for filtering diesel exhaust gasses.

BACKGROUND OF THE INVENTION

Diesel soot particulate traps comprising pleated metal fiber fleece are known, e.g. from U.S. Pat. No. 5,709,722.

Diesel soot particulate traps, which can be regenerated via electrical heating of the filter element itself, are known, e.g. from U.S. Pat. No. 5,800,790.

The presently known filter elements, suitable for electrical regeneration, have the disadvantage that most of the thermal energy, obtained by Joule effects out of electrical energy and used to heat the filter element, is lost due to thermal losses.

SUMMARY OF THE INVENTION

It was found that the losses of thermal energy is caused by 3 effects:
1. The filter medium, generating the thermal energy via Joule effects, looses thermal energy via radiation, e.g. towards the filter housing.
2. Thermal energy is lost via convection, heating the gasses which pas through the filter medium during regeneration. This effect is much larger when the strip is regenerated in stream.
3. Thermal energy is lost due to thermal conduction. E.g. when the filter medium is welded to the housing, a lot of thermal energy is transferred from the filter medium to the housing via this contact. The housing is needlessly heated by this thermal energy conducting.

It is an object of the invention to provide a filter element, to be regenerated electrically, which has a reduced thermal energy loss. Further, it is an object of the present invention to improve the contact between filter medium, being electrically regeneratable, and the housing of the filter element.

It is also an object of the invention to provide a filter unit, comprising at least two, but possibly more than two filter elements, each filter element being regeneratable individually. Such a filter unit as subject of the invention may be used in a diesel exhaust filter pack for stationary diesel engines of for diesel engines, used in vehicles such as boats, trains or other motor vehicle.

Filter pack is to be understood as a filter system, which is installed or used in a gas stream. It comprises a gas inlet, a gas outlet, and at least one filter unit, installed between inlet and outlet.

A filter element as subject of the invention comprises a pleated metal fiber fleece. This metal fiber fleece, preferably sintered, is pleated according to pleating lines, so providing an edge with pleat openings. The gas, to be filtered, has to flow from one side of the fleece (inflow side) to the other side of the fleece (outflow side), passing through the fleece. Appropriate pleat openings have to be closed in order to make the gas to flow through the metal fiber fleece so preventing bypasses from gas from the inflow side to the outflow side, without passing through the metal fiber fleece.

A filter element according to the invention further comprises a filter element housing, which comprises at least two flanks.

According to the present invention, each of these flanks comprising a stiff material layer. A relatively thick layer of ceramic adhesive is used to connect the metal fiber fleece and a stiff material layer, preferably a metal plate or rim to each other. The adhesive is at least present over the whole length of the edge of the metal fiber fleece, but preferably, the whole surface of the side of the stiff material layer is coated with this adhesive. The metal fiber fleece is mounted between the flanks having its pleating lines preferably essentially perpendicular to the stiff material layer of the flanks. The layer of ceramic adhesive is to prevent direct contact over the total length of the edge of the metal fiber fleece, being connected to the flank. It positions the metal fiber fleece, provides the electrically and thermally insulating properties and offers a good seal between the metal fiber fleece and the stiff material layer. A thermally and electrically insulating side is so provided to the stiff material layer. The metal fiber fleece is mounted between the thermally and electrically insulated sides of both flanks provided by the adhesive. The flanks exercise a clamping force on the edges of the metal fiber fleece in a direction essentially parallel to the pleating lines. Meanwhile these flanks close the pleat openings in order to prevent bypasses.

In order to improve the adhesion between stiff material layer and ceramic adhesive, a wire mesh, an expanded or perforated metal sheet may be inserted between the surface of the stiff material layer and the edge of the metal fiber fleece. This mesh or expanded or perforated metal sheet acts so to say as anchoring points for the ceramic adhesive, and it is sunken in the adhesive layer. Best results were obtained using a metal rim and a metal mesh. The metal mesh was spot welded to the metal rim on several points.

The thickness of the adhesive layer is preferably more than 0.5 mm, and less than 2 mm. The edge of the metal fiber fleece is sunken over a certain depth in the adhesive layer, providing a so-called sunken part to the edge of the metal fiber fleece. This sunken part has a height of preferably at least 10% less than the thickness of the adhesive layer, but also preferably in the range of 0.5 mm to 2 mm.

Further, the adhesion between stiff material layer and ceramic adhesive may be obtained by first coating, e.g. spraying a layer of ceramic particles (e.g. by flame spraying of $Al_2O_3$ or $SiO_2$) on the side of the stiff material layer, before providing the ceramic adhesive to the stiff material layer. This layer also further improves the electrical insulation between metal fiber fleece and stiff material layer, which may be required in case the stiff material layer is a metal plate or rim. Such spraying may be done also on the mesh or perforated or expanded metal sheet. Possibly a ceramic layer is sprayed on the mesh or expanded or perforated sheet, after it has been spot welded to e.g. a metal rim or plate.

To further improve the ductility and the resistance to thermal cycling of the ceramic adhesive layer between flanks and sintered metal fiber layer, metal particles may be added to the ceramic adhesive. Metal short fibers are preferred over metal powder, since the ductility of cured ceramic adhesive is much more superior as compared to ceramic adhesive comprising metal powder. Surprisingly it was found that the electrical insulation properties of such adhesive layer were influenced only slightly, as compared to pure ceramic adhesion.

Short metal fibers preferably comprises fibers with an equivalent diameter "D" between 1 and 150 $\mu$m preferably between 2 and 100. Most preferably the diameter ranges between 2 and 50 $\mu$m or even between 2 and 35 $\mu$m such as 2, 4, 6.5, 8, 12 or 22 $\mu$m. Preferably, but not necessarily, short metal fibers have an L/D-ratio of more than 5, preferably more than 10, wherein L stands for the average length of the short metal fibers.

Preferably, the layer of ceramic adhesive comprises at least 0.5% by weight of short metal fibers, most preferably more than 10% by weight or even more than 20% by weight. Preferably the layer of ceramic adhesive comprises less than 30% by weight of short metal fibers.

In general, and also according to the present invention, "stiff material" is to be understood as an inflexible material, which to a certain extend lacks suppleness or pliability and being having the property of being difficult to bend, as is generally known for ceramic or metal plates.

According to the invention, the thermally and electrically insulating side of the flanks closes the pleat openings, which are to be closed in order to prevent bypasses from gas to be filtered. These sides fix the metal fiber fleece in its position.

Filter elements, as subject of the invention may further comprise other elements, to form, together with the flanks mentioned above, the filter element housing. These elements may also be thermally and electrically insulated, in order to reduce the thermal energy, lost due to radiation, from the metal fiber fleece to these elements or due to the heating of these elements because of contact between hot gas and housing. E.g. a perforated metal screen or a more permeable thermally insulating fabric may be applied, in order to further reduce the thermal losses due to radiation towards the adjacent filter units of the filter pack wall. In case of a more permeable thermally insulating fabric, preferably, a $SiO_2$-grid woven fabric is used.

Such filter elements as subject of the invention have several advantages.

The thermal energy loss due to conduction is prevented, since the sides of the flanks, used to close the pleat openings have thermally insulating properties. The metal fiber fleece is only in contact with the filter housing via this side. The pleating of the metal fiber fleece also causes thermal radiation, being radiated from one pleat to the adjacent pleats.

Since electrical current is to be supplied only to the metal fiber fleece, in order to regenerate the fleece, the fleece is electrically insulated from the filter housing at its edge, by the electrically insulating side.

Preferably, the metal fiber fleece is to be resistant to bulging. A sintered and pleated metal fiber fleece has a rather high bulging resistance due to the pleated shape, to provide an edge.

In the scope of the present invention, with metal fiber fleece is meant a fleece, comprising metal fibers, preferably steel fibers. The alloy of metal or steel may be chosen dependant on the temperature range which is to be withstand by the metal fiber fleece. Stainless steel fibers of AISI alloys of the 300- or 400 series, or alloys such as Inconel® are to be preferred. In case high temperatures are to be withstand during regeneration, alloys comprising Fe, Al and Cr are preferred, such as Fecralloy®. The fibers may be obtained by any presently known production method, such as bundle drawing or shaving. Fiber diameters between 1 and 100 $\mu$m are to be used, preferably between 2 and 50 $\mu$m, e.g. between 12 and 35 $\mu$m such as 12, 17 and 22 $\mu$m. Preferably the fleece is sintered using appropriate sintering circumstances, according to the alloy used. Preferably, the metal fibers are obtainable by bundle drawing or coil shaving. The latter is described more in detail in WO97/04152.

A metal plate or rim is preferably provided out of stainless steel. Most preferably the metal fiber of the metal fiber fleece and the metal plate or rim are out of the same metal alloy.

Also thickness, weight per $m^2$, pore diameter and other fleece parameters may be chosen, according to the particles which are to be retained and/or the application for which the filter element is to be used.

Preferably, the metal fiber fleece used to provide the filter elements, as subject of the invention comprises different layers of metal fibers. Each fiber layer comprises fibers with a certain equivalent diameter. Best filtering results were obtained when a layer with the coarsest fibers is facing the inflow side of the filter element, whereas a layer of metal fibers with the finest fibers is facing the out-flow side of the filter. An example of such layered metal fiber fleece is a metal fiber fleece comprising a layer of metal fibers with equivalent diameter of 35 $\mu$m, and a layer of metal fibers with an equivalent diameter of 17 $\mu$m. Possibly a layer of metal fibers with equivalent diameter of 22 $\mu$m can be located between these two layers. Porosity of more than 85% is preferred, while the weight per square meter of the fleece is preferably less than 1500 $g/m^2$, e.g. 1450 $g/m^2$.

Equivalent diameter is to be understood as the diameter of a radial cut of an imaginary round fiber, having an identical surface as the radial cut of the fiber under consideration.

According to the present invention, preferably the metal fiber fleece consists of only one strip of filter media comprising metal fibers. Most preferably, this strip is rectangular. However alternatively, the metal fiber fleece may consist of more than one strip of filter media comprising metal fibers which strips are mounted between the two flanks of the filter element as subject of the invention.

Sintered metal fiber fleece has a good resistance against buckling, when put under mechanical load in a direction, parallel to the plane surface of the fleece. To improve the buckling resistance, the fleece may be corrugated using preferably repetitive undulations, with a wavelength preferably less than 5 times the thickness of th fleece. The amplitude of the corrugation is also preferably less than 5 times the thickness of the fleece. The buckling resistance may be improved more than 50% in ambient circumstances. Then the fleece is heated to more than 600° C., the buckling improvement is still more than 30%.

The metal fiber fleece, used to provide a filter element as subject of the invention further comprise at least two but possibly more than two contact bodies, fixed, e.g. clamped on or sintered to the metal fiber fleece. According to the present invention, a contact body is a body to which the electric current is supplied by the electric circuit, in order to regenerate the filter element. This contact body divides in a proper way the electric current over the total surface of the metal fiber fleece. Preferably, these contact bodies are metal foils, e.g. Ni-foil or metal woven meshes, sintered at both ends of the metal fiber fleece.

Special care is to be taken in case the metal fiber fleece is pleated in such a way that both ends of the metal fiber fleece, each of them to be contacting one pole of the electric circuit, are located close to each other. Both contact bodies are to be insulated from each other. This can be done by inserting one or more electrically insulating plates between both contact bodies, e.g. mica plates. Both contact bodies may be connected to this electrically insulating plate using bolts and nuts or alike. Preferably, the contact bodies are applied on the ends in such a way that the contact bodies extend from the metal fiber fleece in the off-stream direction of the filter element.

An alternative improved filter element may also be obtained in an other way. Each flank may comprise a ceramic plate, which comes into contact with the edge. The metal fiber fleece is clamped between those two ceramic plates. The ceramic plate provides thermal and electrical insulating properties to the flanks. Possibly these ceramic plates have recesses. The recess is preferably larger than 0.5 mm, but may be in the range of 0.5 mm to 2 mm. These recesses are obtainable by providing e.g. a slot in the thermally and electrically insulating ceramic plates. These slots correspond with the edge, in such a way that they engage closely with the edge when the pleated metal fiber fleece is mounted between the two flanks. The edge is introduced in the slots, so providing a recess of the edge. The slot fits perfect to the edge.

It should be noted that the edge is installed in the slot in such a way that small movements, e.g. thermal expansions or vibrations, of the pleated metal fiber fleece may be allowed. This freedom of movement is obtained by providing slots, which are slightly deeper than the recess of the edge in the thermally and electrically insulating side. Less preferably, although possibly, the metal fiber fleece is glued to the ceramic plate using ceramic or high temperature resistant adhesive.

To, protect the ceramic plates against mechanical damages, the ceramic plates may be supported by a metal plate, being present at the other side of the ceramic plate, not contacting the metal fiber fleece. Alternatively, this metal plate may have the shape of a rim, in which the ceramic plate fits.

Alternatively, the ceramic plate of such a flank, according to the invention, may be replaced by a thermally and electrically insulating fabric, e.g. a ceramic textile layer, which is supported by a stiff material layer, preferably a metal plate or rim.

A recess is also obtainable by such flanks, which comprise a stiff material layer, and a thermally and electrically insulating fabric on at the thermally and electrically insulating side of the flank. The edge of the pleated metal fiber fleece is then squeezed or pressed between the thermally and electrically insulating flanks. Since the pleated metal fiber fleece has sufficient buckling resistance, the pleated metal fiber fleece is pressed into the thermally and electrically insulating fabric, a recess of the edge of the pleated metal fiber fleece in the thermally and electrically insulating sides of the flanks is so provided.

The recess of the edge should at least be sufficient to prevent the pleated metal fiber fleece to move along with the gas to be filtered. This phenomenon is so called 'blow through'. The recess is preferably larger than 0.5 mm, but may be in the range of 0.5 mm to 2 mm.

In the scope of the present invention, a thermally and electrically insulating fabric is to be understood as a non-woven, woven, braided or knitted textile fabric, comprise thermally and electrically insulating fibers at the surface of the fabric, which is to contact the edge of the metal fiber fleece. Most preferably, the whole fabric consist of such thermally and electrically insulating fibers, however, a combination of thermally and electrically insulating fibers at the side contacting the edge, with metal fibers at the opposite side may be used. Such thermally and electrically insulating fibers preferably are ceramic fibers, such as fibers, comprising $Al_2O_3$ and/or $SiO_2$, e.g. NEXTEL®-fibers.

The fabric thickness is preferably between 3 to 6 mm. A woven or nonwoven fabric is preferred.

When according to the invention, flanks comprising slots are used to provide a filter element as subject of the invention, the thermally and electrically insulating side of the flanks are obtainable by using ceramic materials, e.g. based on $Al_2O_3$ and or $SiO_2$ or mica to provide this side of the flank. The flank may be provided out of one material, or may comprise different layers, provided by different materials. One understands that, in case different layers are used to provide the flanks, the slots are to be provided in layers, which are thermally and electrically insulating.

Filter elements as subject of the invention may further comprise other flanks, to form, together with the flanks mentioned above, the filter housing, providing an inlet and an outlet to the filter element. These flanks may also be thermally and electrically insulated, in order to reduce the thermal energy, lost due to radiation, from the metal fiber fleece to these plates or due to the heating of the housing of the filter element due to contact between hot gas and housing.

Further, surprisingly it was found that, when a filter element as subject of the invention comprising a thermally and electrically insulating fabric is used, e.g. to filter diesel exhaust gas, loaded with soot particles, the filter element works self-sealing, even after regenerating. This is explained as follows.

The edge of the metal fiber fleece is mounted or pressed between the thermally and electrically insulating sides of the flanks.

In case a thermally and electrically insulating fabric is used, due to the textile nature of the fabric, the metal fiber fleece is recessed to a certain depth in the fabric. Under normal circumstances, this recess is sufficient to close all voids in the fabric next to the recessed part of the metal fiber fleece, so no gas can bypass the metal fiber fleece through the thermal and electrical insulating fabric. In case there is a small void in the fabric, which is not closed by the recessed part of the metal fiber fleece, small amounts of exhaust gas will bypass the metal fiber fleece via this void. The soot, being present in the exhaust gas, will be trapped by the fabric, so closing the void space. When the metal fiber fleece is now regenerated, the thermal and electrical insulating fabric will not be heated enough in order to incinerate the soot, trapped by the fabric at the void space. So the bypass of gas through the fabric is hindered after the void spaces are filled with soot, due to such bypass. Th filter seals itself.

An identical effect is obtained when the edge of the pleated metal fiber fleece is mounted in a slot in the thermally and electrically insulating side of a flank. As said, a small void space is provided underneath the edge, to allow small movements. The slot fits that good to the edge at the surface to the pleated metal fiber fleece, that under normal circumstances, no gas can bypass the metal fiber fleece via the sides of the edge and these voids. In case there is a small gap between the side of the edge and the slot, soot will be trapped and retained in these gaps. When the filter is regenerated, the soot will not be heated enough in order to incinerate. So the bypass of gas through the gaps is hindered after the gaps are filled with soot, due to such bypass. The filter seals itself.

Filter elements as subjects of the invention are used to provide filter units. Several filter elements may be combined, e.g. stacked one on top of the other. To avoid thermal losses, the different filter elements are separated from each other by a thermally insulating layer, e.g. a thermally insulating and thermal resistant layer of textile, e.g. a woven $SiO_2$-fabric.

Filter elements as subject of the invention may be used to filter hot gases, such an exhaust gases from diesel internal combustion engines. Several filter elements or filter units comprising filter elements as subject of the invention may be used in parallel, e.g. to be able to regenerate at least one filter element, through which no gas flows, so reducing convection heat losses, while the other filter elements continue to filter the gas stream. They may be mounted in series connection, to filter the gas stream in different steps, e.g. for different particle sizes.

Each filter element can be regenerated individually, preferably one after the other. The filter element may be regenerated inline, while gas continues to flow through the filter element, or off-line, while gas is partially or fully prevented to flow through the filter element.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
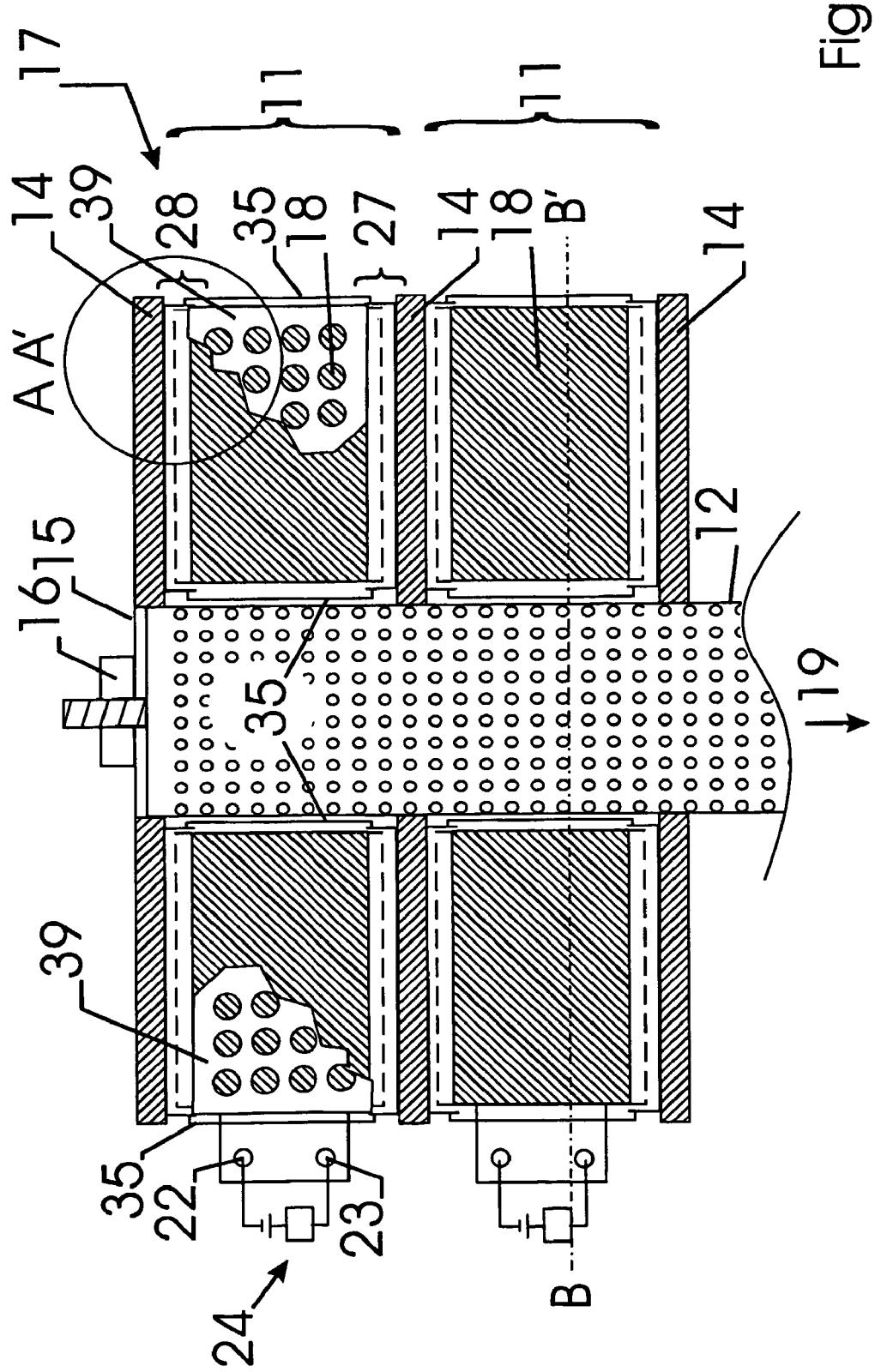
FIG. 1 shows schematically a general view of a filter unit as subject of the invention
Figure 2:
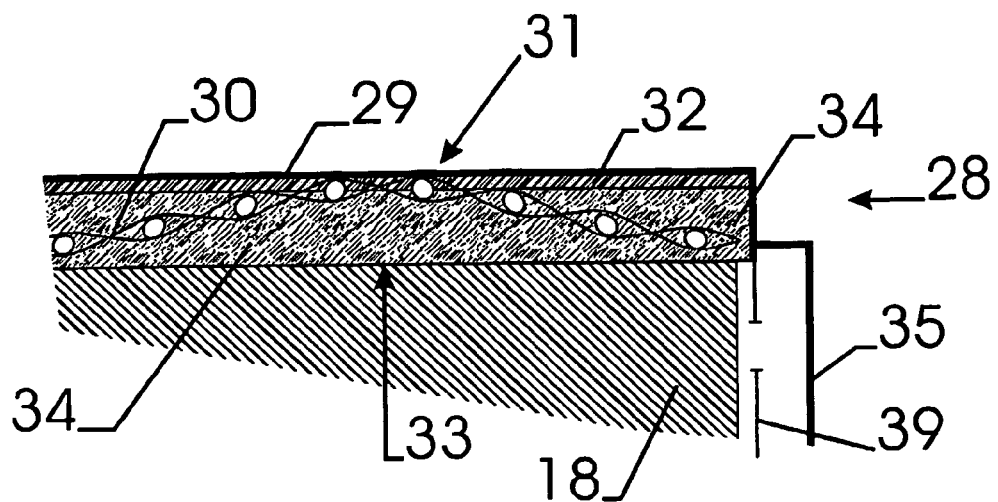
FIG. 2 shows schematically an enlarged view of part AA' of the filter unit of FIG. 1.
Figure 3:
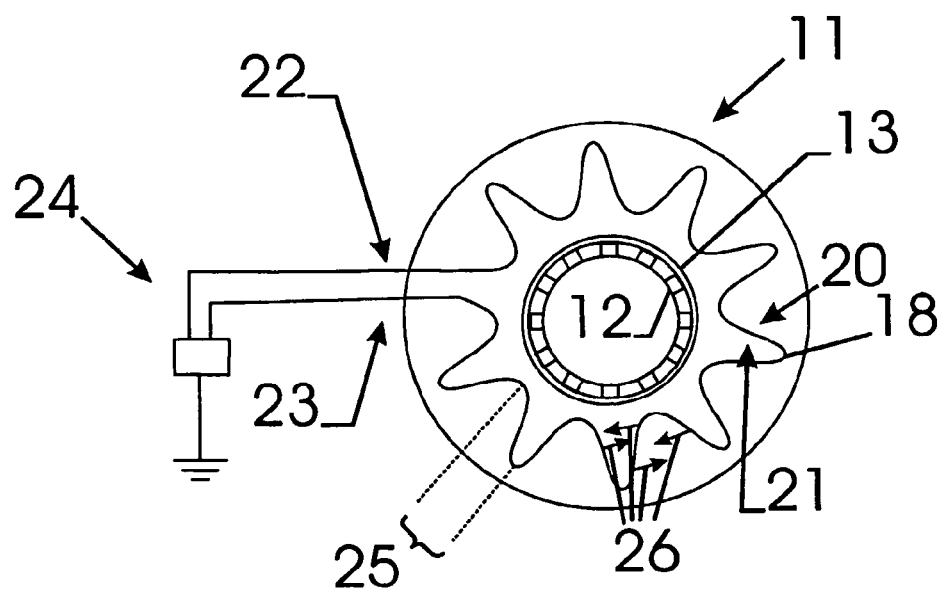
FIG. 3 shows schematically a section according to the plane BB' of the filter unit of FIG. 1.

A preferred filter unit as subject of the invention is shown in FIGS. 1, 2 and 3.

The filter unit comprises a number of filter elements 11, which are stacked one on top of the other. They all have a ring-like shape. A perforated metal tube 12 is positioned inside the inner opening 13 of the filter element. Between each filter element, a disc-like $SiO_2$ felt material 14 is positioned to thermally insulate the different filter elements from each other. At both ends of the filter unit, a metal plate 15 is fixed against the upper and lower filter element e.g. as shown in FIG. 1 by means of a screw 16, which pushes the plate towards the filter element. Between this plate 15 and the upper or lower filter element, another disc-like $SiO_2$ felt material 14 is positioned.

When this filter unit is used, preferably the gas to be filtered flows in from the outer side of the filter elements (indicated with arrow 17), through the filter medium 18 through the perforations of the metal tube 12, to the further exhaust system as indicated with arrow 19.

Taking each filter element of the present embodiment into consideration, a metal fiber fleece is used as filter medium 18. The 'dirty' gas flows in via the inflow side 20, through the metal fiber fleece, via the outflow side 21 of the metal fiber fleece to the exhaust system. The metal fiber fleece is connected via two contact bodies 22 and 23 to an electric circuit 24, providing electrical current to the metal fiber fleece in order to regenerate the dirt, e.g. soot, trapped in and on the filter medium. The metal fiber fleece is preferably pleated in such a way that the thermal radiation heat, generated by the pleats 25 during regeneration, radiates to the adjacent pleats, as indicated by arrows 26. An important reduction of electrical power is obtained using this radiation heat to propagate and support the combustion of the filtered particles The set-up of a preferred embodiment of the filter element is shown in FIG. 2. A flank 28 of the filter element comprises a metal rim 29, to which a wire mesh 30 is spot welded on several spots 31. A fine layer of ceramic material $Al2O3$ 32 was sprayed on the electrical and thermal insulating side 33 of the flank. A relatively thick layer of ceramic adhesive 34 was applied on this mesh and the electrical and thermal insulating side 33, before the metal fiber fleece 18 was adhered to this ceramic adhesive 34, which comprises more than 10% of weight of short metal fibers.

The thickness of the adhesive layer was 2 mm and an adhesive based on $ZrO2-MgO$ compound was used. The edge of the metal fiber fleece was sunken in the adhesive layer over a depth of 1.5 mm. Metal plate and metal mesh were provided out of stainless steel AISI 304. Alternatively stainless steel AISI 430 was used.

To improve the resistance to the mechanical tension, due to the fixation of the different elements on top of each other by screw 16, several studs 35 may be welded to the upper and lower rim of each filter element. As shown in FIG. 1 and FIG. 2, around the filter element 11, a perforated metal plate 39 may be present (as only shown partially in the Figures for the sake of clarity).

Figure 4:
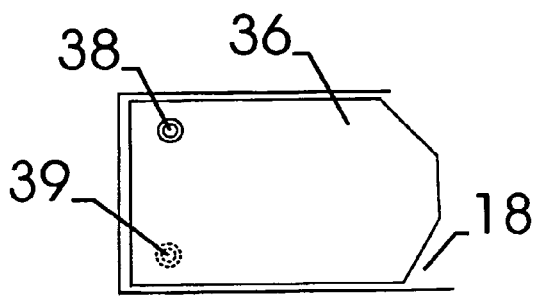
FIG. 4 shows schematically a side view of the contact bodies from a filter element as subject of the invention.
Figure 4:
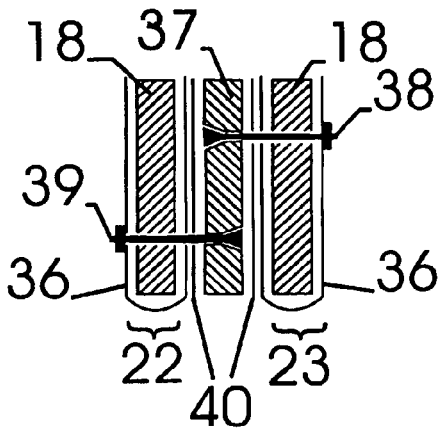
Figure 5:
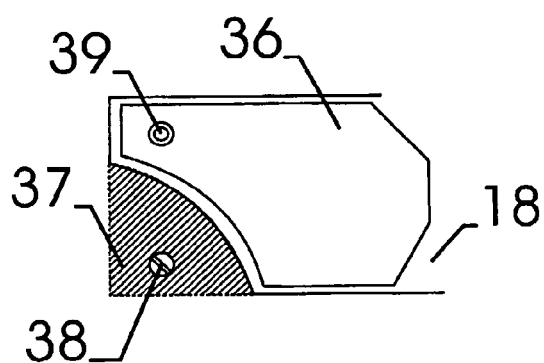
FIG. 5 shows schematically a view of alternative contact bodies from a filter element as subject of the invention.
Figure 5:
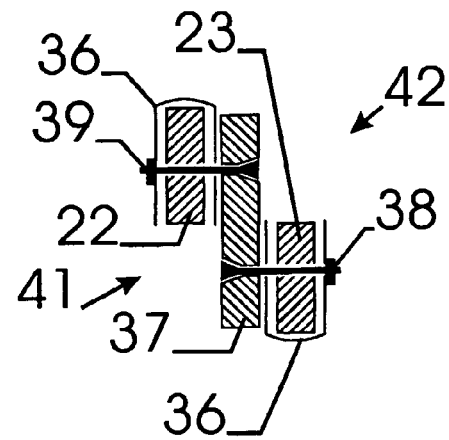

Turning now to the contact bodies 22 and 23 of the preferred embodiment as shown in FIG. 4 and FIG. 5, a fine Ni-sheet 36 was sintered to the ends of the metal fiber fleece. Both contact bodies were brought together and fixed to an insulating plate 37, e.g. a micaplate by means of two bolts 38 and 39. In order to avoid electrical contact between contact body 22 and bolt 38, and between contact body 23 and bolt 39, two mica sheets were inserted between the insulating plate 37 and the contact bodies 22 and 23.

An alternative set-up is shown in FIG. 5. An identical set-up as in FIG. 4 is used, but the contact body 22 is shaped in such a way that no material of this contact body 22 is present at behind bolt 38, fixing the contact body 23 to the insulating plate 37. Identically, the contact body 23 is shaped in such a way that no material of this contact body 23 is present at behind bolt 39, fixing the contact body 22 to the insulating plate 37. Using such contact bodies, the use of two mica plates 40 may be avoided, which may simplify the construction of the filter element.

Figure 6:
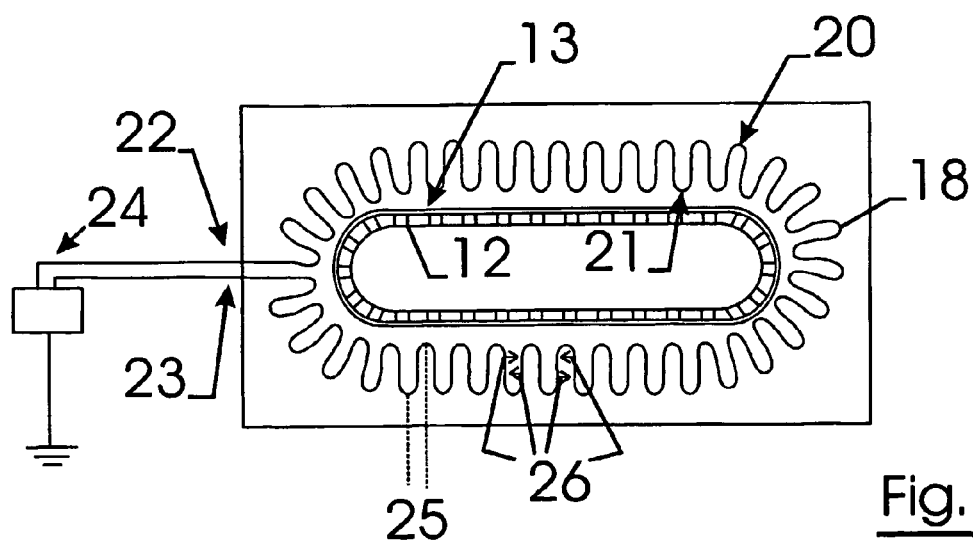
FIG. 6, FIG. 7 and FIG. 8 show schematically a section according to the plane BB' of an alternative embodiment of a filter unit as subject of the invention.

An alternative cut according to BB' is shown in FIG. 6. The perforated tube in this embodiment has an elliptic section. Also here, the metal fiber fleece is pleated according to pleating lines, which enables radiation from one pleat to another during regeneration.

Figure 7:
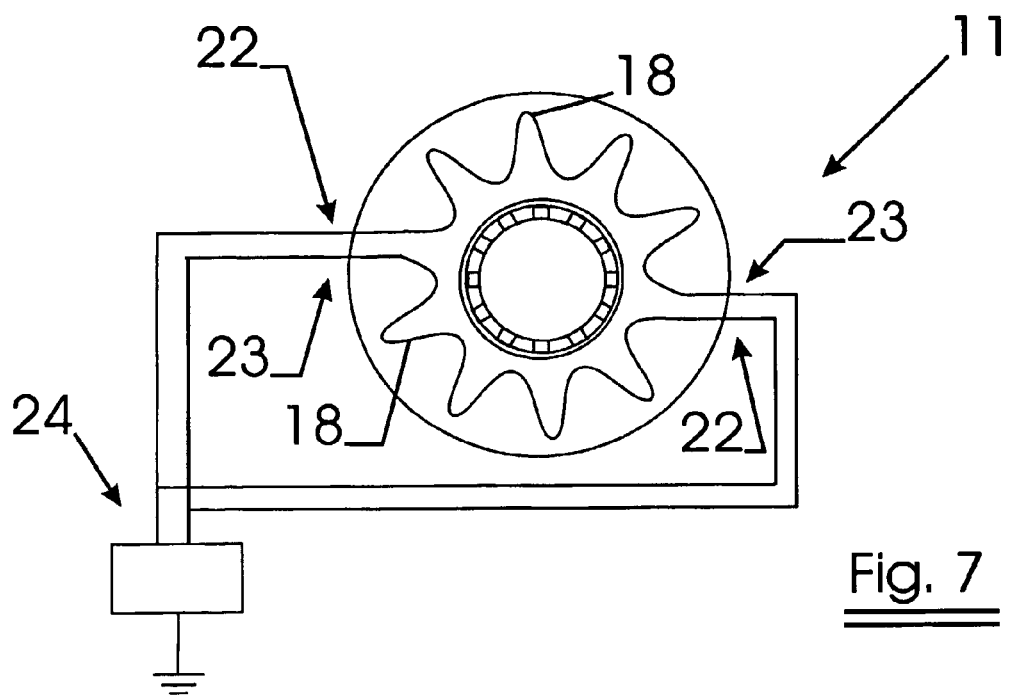

An other alternative cross section of a filter element as subject of the invention is shown in FIG. 7. The filter element in this embodiment comprises two metal fiber fleece strips, which together form the whole filter media of the filter element. Both metal fiber fleece strips have two contact bodies (22 and 23), at one end each, which are connected to an appropriate electric circuit 24.

Figure 8:
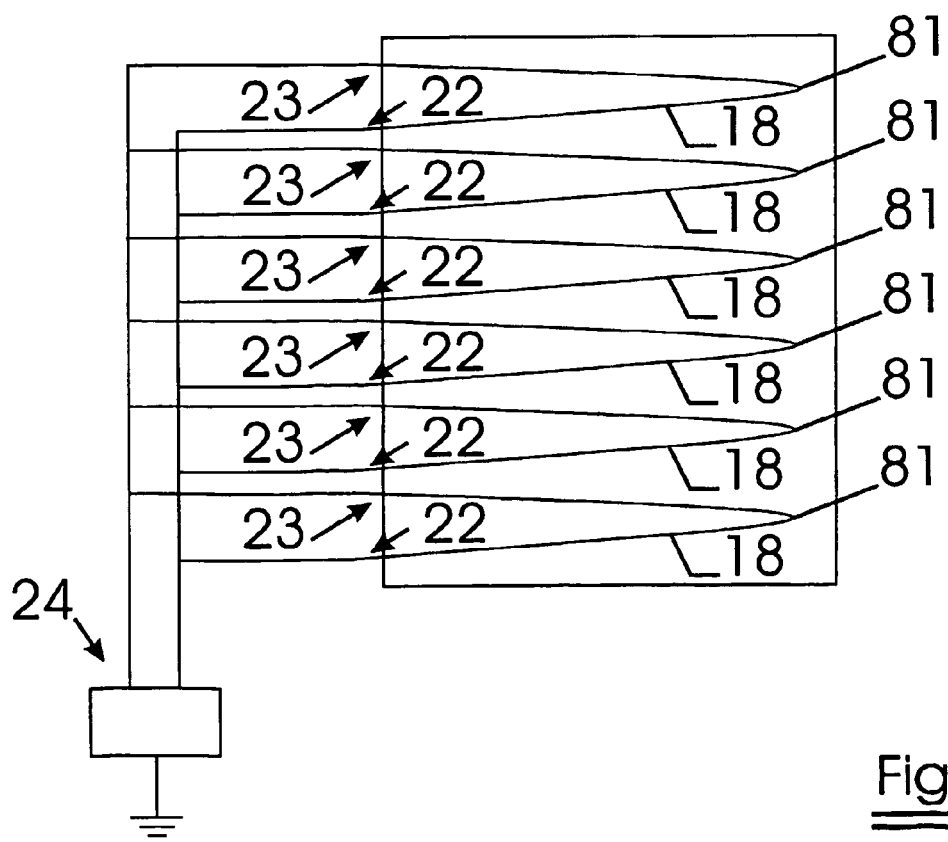

Another alternative cross section of a filter element as subject of the invention is shown in FIG. 8. The filter element comprises a set of metal fiber fleece strips, each being pleated over one pleating line 81. All strips are mounted side by side. Each metal fiber fleece strip has two contact bodies (22 and 23), one at each end of the strip. The contact bodies are lined up and connected to an appropriate electric circuit 24.

Figure 9:
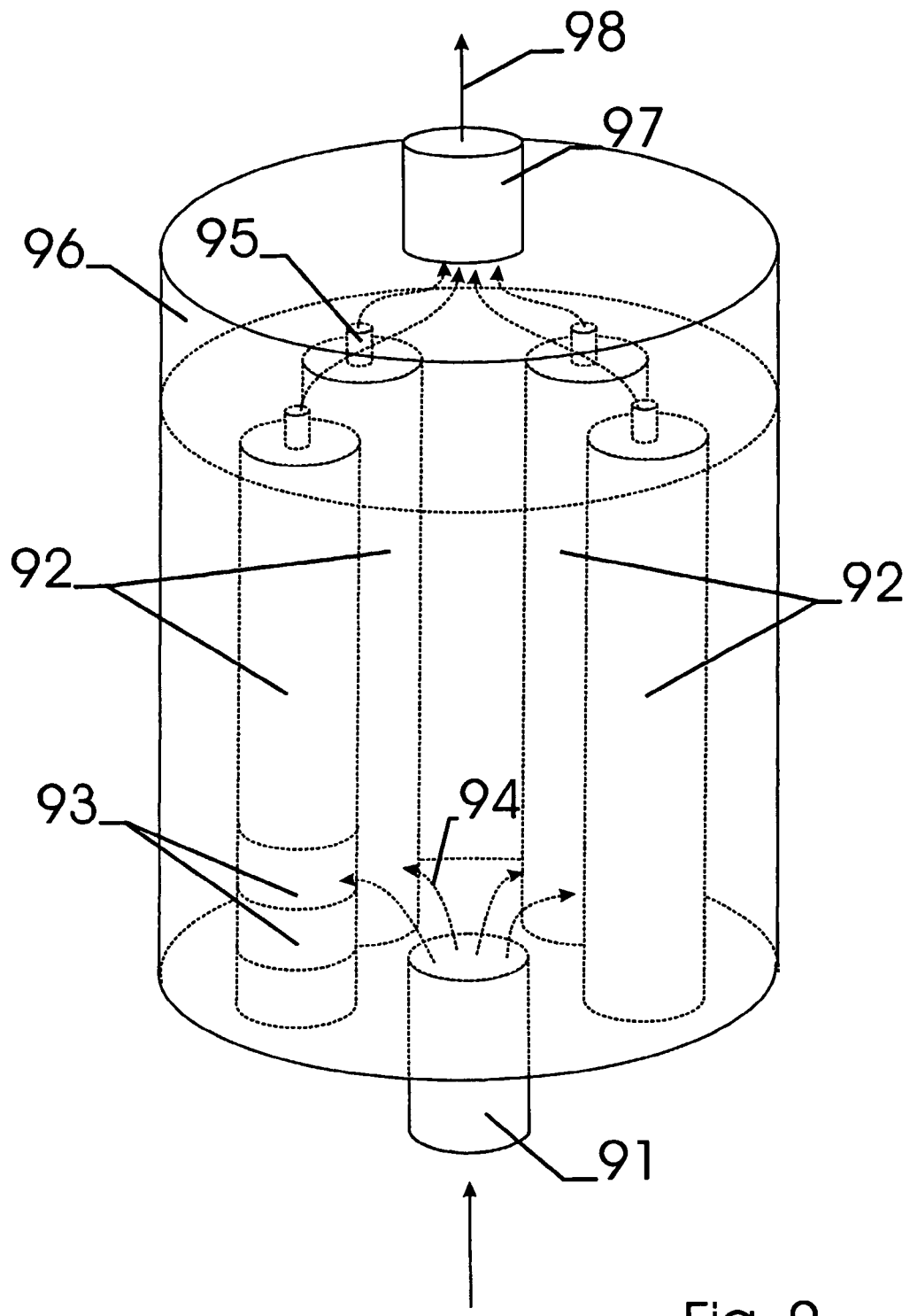
FIG. 9 shows a diesel exhaust cleaning system in a muffler-like shape, comprising different filter units as subject of the invention.

As shown in FIG. 9, gas to be filtered may enter into a muffler system, via inlet 91. Several filter units 92, each comprising several filter elements 93 are present in the muffler-like system. The gas to be filtered goes, as indicated with arrow 94, through the filter media of each filter element and leaves the filter unit 92 via the perforated tube 95 in a collecting chamber 96. Via an outlet 97, the filtered exhaust gas flows further through the exhaust system as indicated with arrow 98.

As filter medium, a sintered metal fiber fleece comprising three layers of stainless steel fibers is used. A first layer comprises 600 g/m$^2$ of Fecralloy® fibers with equivalent diameter of 17 $\mu$m. A second layer of Fecralloy® fibers is applied on top of the first layer. This layer comprises 250 g/m$^2$ of fibers with equivalent diameter of 22 $\mu$m. A third layer of F cralloy® fibers is applied on top of the second layer, having fibers with equivalent diameter of 35 $\mu$m. This third layer comprises 600 g/m$^2$ fibers.

A soot retention of 91% was obtained, using a stainless steel fleece, having a porosity of 85%.

The length of the metal fiber fleece in the above described embodiments is preferably 1200 mm, while the height of the metal fiber fleece strip is preferably between 30 and 35 mm, e.g. 33.75 mm.

The soot was so-called depth filtered. This is to be understood as the fact that soot particles were trapped through the whole depth of the filter.

Only 1 minute per element was needed to regenerate the filter unit, while consuming only 750 W to 1500 W The pressure drop over the filter element was set to 100 mbar before regeneration.

What is claimed is:

1. A filter element comprising a pleated metal fiber fleece being pleated according to pleating lines providing an edge with pleat openings to be closed in order to make gas flow through said metal fiber fleece, said filter element comprising at least two flanks, each of said flanks comprising a stiff material layer, said stiff material layer and said metal fiber fleece being connected using a layer of ceramic adhesive, said layer of ceramic adhesive preventing direct contact of said metal fiber fleece over the length of said edge of said metal fiber fleece with a flank, said flanks being essentially perpendicular to said pleating lines, said flanks closing said pleat openings in order to prevent bypasses, said layer of ceramic adhesive having a thickness of more than 0.5 mm, said thickness being less than 2 mm.

2. A filter element comprising a pleated metal fiber fleece being pleated according to pleating lines providing an edge with pleat openings to be closed in order to make gas flow through said metal fiber fleece, said filter element comprising at least two flanks, each of said flanks comprising a stiff material layer, said stiff material layer and said metal fiber fleece being connected using a layer of ceramic adhesive, said layer of ceramic adhesive preventing direct contact of said metal fiber fleece over the length of said edge of said metal fiber fleece with a flank, said flanks being essentially perpendicular to said pleating lines, said flanks closing said pleat openings in order to prevent bypasses, said ceramic adhesive layer having a thickness, said layer of ceramic adhesive comprising short metal fibers having an equivalent diameter in the range of 1 to 150 $\mu$m.

3. A filter element as in claim 2, said layer of ceramic adhesive comprising at least 0.5% of weight of said short metal fibers, said layer of ceramic adhesive comprising less than 30% of weight of said short metal fibers.

4. A filter element comprising a pleated metal fiber fleece being pleated according to pleating lines providing an edge with pleat openings to be closed in order to make gas flow through said metal fiber fleece, said filter element comprising at least two flanks, each of said flanks comprising a stiff material layer, said stiff material layer and said metal fiber fleece being connected using a layer of ceramic adhesive, said layer of ceramic adhesive preventing direct contact of said metal fiber fleece over the length of said edge of said metal fiber fleece with a flank, said flanks being essentially perpendicular to said pleating lines, said flanks closing said pleat openings in order to prevent bypasses, said ceramic adhesive layer having a thickness, said edge of said metal fiber fleece being sunken in said layer of ceramic adhesive over a sunken part, said sunken part having a height at least 10% less than said thickness of said layer of ceramic adhesive.

5. A filter element comprising a pleated metal fiber fleece being pleated according to pleating lines providing an edge with pleat openings to be closed in order to make gas flow through said metal fiber fleece, said filter element comprising at least two flanks, each of said flanks comprising a stiff material layer, said stiff material layer and said metal fiber fleece are connected using a layer of ceramic adhesive, said layer of ceramic adhesive preventing direct contact of said metal fiber fleece over the length of said edge of said metal fiber fleece with a flank, said flanks being essentially perpendicular to said pleating lines, said flanks closing said pleat openings in order to prevent bypasses, said ceramic adhesive layer having a thickness, said flanks further comprising a wire mesh or an expanded or perforated metal sheet.

6. A filter element as in claim 1, said stiff material layer being a metal plate or metal rim.

7. A filter element as in claim 1, said layer of ceramic adhesive comprising short metal fibers having an equivalent diameter in the range of 1 to 150 $\mu$m.

8. A filter element as in claim 7, said layer of ceramic adhesive comprising at least 0.5% of weight of said short metal fibers, said layer of ceramic adhesive comprising less than 30% of weight of said short metal fibers.

9. A filter element as in claim 1, said edge of said metal fiber fleece being sunken in said layer of ceramic adhesive over a sunken part, said sunken part having a height at least 10% less than said thickness of said layer of ceramic adhesive.

10. A filter element as in claim 1, said layer of ceramic adhesive being present over the length of said edge of said metal fiber fleece.

11. A filter element as in claim 10, said flanks further comprising a wire mesh or an expanded or perforated metal sheet.

12. A filter element as in claim 1, said flanks further comprising a wire mesh or an expanded or perforated metal sheet.

13. A filter element as in claim 1, said flanks having one side being coated with a layer of ceramic adhesive, said sides making contact with said edge of said metal fiber fleece.

14. A filter element as in claim 1, wherein said stiff material layer is coated with a layer of ceramic particles.

15. A filter element as in claim 1, said filter element comprising more than 1 strip of metal fibers.

16. A filter element as in claim 1, said metal fiber fleece comprising stainless steel fibers.

17. A filter unit comprising at least two filter elements as in claim 1, said filter elements being thermally insulated from each other.

18. A filter element as in claim 2, said stiff material layer being a metal plate or metal rim.

19. A filter element as in claim 2, said edge of said metal fiber fleece being sunken in said layer of ceramic adhesive over a sunken part, said sunken part having a height at least 10% less than said thickness of said layer of ceramic adhesive.

20. A filter element as in claim 2, said layer of ceramic adhesive being present over the length of said edge of said metal fiber fleece.

21. A filter element as in claim 20, said flanks further comprising a wire mesh or an expanded or perforated metal sheet.

22. A filter element as in claim 2, said flanks further comprising a wire mesh or an expanded or perforated metal sheet.

23. A filter element as in claim 2, said flanks having one side being coated with a layer of ceramic adhesive, said side making contact with said edge of said metal fiber fleece.

24. A filter element as in claim 2, wherein said stiff material layer is coated with a layer of ceramic particles.

25. A filter element as in claim 2, said filter element comprising more than 1 strip of metal fibers.

26. A filter element as in claim 2, said metal fiber fleece comprising stainless steel fibers.

27. A filter unit comprising at least two filter elements as in claim 2, said filter elements being thermally insulated from each other.

28. A filter element as in claim 4, said stiff material layer being a metal plate or metal rim.

29. A filter element as in claim 4, said layer of ceramic adhesive comprising short metal fibers having an equivalent diameter in the range of 1 to 150 $\mu$m, said layer of ceramic adhesive comprising at least 0.5% of weight of said short metal fibers, said layer of ceramic adhesive comprising less than 30% of weight of said short metal fibers.

30. A filter element as in claim 4, said layer of ceramic adhesive being present over the length of said edge of said metal fiber fleece.

31. A filter element as in claim 30, said flanks further comprising a wire mesh or an expanded or perforated metal sheet.

32. A filter element as in claim 4, said flanks further comprising a wire mesh or an expanded or perforated metal sheet.

33. A filter element as in claim 4, said flanks having one side being coated with a layer of ceramic adhesive, said side making contact with said edge of said metal fiber fleece.

34. A filter element as in claim 4, wherein said stiff material layer is coated with a layer of ceramic particles.

35. A filter element as in claim 4, said filter element comprising more than 1 strip of metal fibers.

36. A filter element as in claim 4, said metal fiber fleece comprising stainless steel fibers.

37. A filter unit comprising at least two filter elements as in claim 4, said filter elements being thermally insulated from each other.

38. A filter element as in claim 5, said stiff material layer being a metal plate or metal rim.

39. A filter element as in claim 5, said layer of ceramic adhesive comprising short metal fibers having an equivalent diameter in the range of 1 to 150 $\mu$m, said layer of ceramic adhesive comprising at least 0.5% of weight of said short metal fibers, said layer of ceramic adhesive comprising less than 30% of weight of said short metal fibers.

40. A filter element as in claim 5, said layer of ceramic adhesive being present over the length of said edge of said metal fiber fleece.

41. A filter element as in claim 5, said flanks having one side being coated with a layer of ceramic adhesive, said side making contact with said edge of said metal fiber fleece.

42. A filter element as in claim 5, wherein said stiff material layer is coated with a layer of ceramic particles.

43. A filter element as in claim 5, said filter element comprising more than 1 strip of metal fibers.

44. A filter element as in claim 5, said metal fiber fleece comprising stainless steel fibers.

45. A filter unit comprising at least two filter elements as in claim 5, said filter elements being thermally insulated from each other.

46. A filter element as in claim 40, said stiff material layer being a metal plate or metal rim.

47. A filter element as in claim 40, said layer of ceramic adhesive comprising short metal fibers having an equivalent diameter in the range of 1 to 150 $\mu$m, said layer of ceramic adhesive comprising at least 0.5% of weight of said short metal fibers, said layer of ceramic adhesive comprising less than 30% of weight of said short metal fibers.

48. A filter element as in claim 40, said flanks having one side being coated with a layer of ceramic adhesive, said side making contact with said edge of said metal fiber fleece.

49. A filter element as in claim 40, wherein said stiff material layer is coated with a layer of ceramic particles.

50. A filter element as in claim 40, said filter element comprising more than 1 strip of metal fibers.

51. A filter element as in claim 40, said metal fiber fleece comprising stainless steel fibers.

52. A filter unit comprising at least two filter elements as in claim 40, said filter elements being thermally insulated from each other.

53. A method of using a filter element for filtering diesel exhaust gas, comprising the steps of:
   providing a filter element as in claim 1 in an exhaust system for diesel exhaust gas; and
   allowing diesel exhaust gas to flow through the metal fiber fleece of the filter element for retention of soot particles out of said diesel exhaust gas.

54. A method of using a filter element for filtering diesel exhaust gas, comprising the steps of:
   providing a filter element as in claim 2 in an exhaust system for diesel exhaust gas; and
   allowing diesel exhaust gas to flow through the metal fiber fleece of the filter element for retention of soot particles out of said diesel exhaust gas.

55. A method of using a filter element for filtering diesel exhaust gas, comprising the steps of:
   providing a filter element as in claim 4 in an exhaust system for diesel exhaust gas; and
   allowing diesel exhaust gas to flow through the metal fiber fleece of the filter element for retention of soot particles out of said diesel exhaust gas.

56. A method of using a filter element for filtering diesel exhaust gas, comprising the steps of:
   providing a filter element as in claim 5 in an exhaust system for diesel exhaust gas; and
   allowing diesel exhaust gas to flow through the metal fiber fleece of the filter element for retention of soot particles out of said diesel exhaust gas.

57. A method of using a filter element for filtering diesel exhaust gas, comprising the steps of:
   providing a filter element as in claim 40 in an exhaust system for diesel exhaust gas; and
   allowing diesel exhaust gas to flow through the metal fiber fleece of the filter element for retention of soot particles out of said diesel exhaust gas.

58. A method of using a filter element for filtering diesel exhaust gas, comprising the steps of:

providing a filter unit as in claim 17 in an exhaust system for diesel exhaust gas; and allowing diesel exhaust gas to flow through the metal fiber fleece of the filter elements for retention of soot particles out of said diesel exhaust gas.

59. A method of using a filter element for filtering diesel exhaust gas, comprising the steps of:

providing a filter unit as in claim 27 in an exhaust system for diesel exhaust gas; and allowing diesel exhaust gas to flow through the metal fiber fleece of the filter elements for retention of soot particles out of said diesel exhaust gas.

60. A method of using a filter element for filtering diesel exhaust gas, comprising the steps of:

providing a filter unit as in claim 37 in an exhaust system for diesel exhaust gas; and allowing diesel exhaust gas to flow through the metal fiber fleece of the filter elements for retention of soot particles out of said diesel exhaust gas.

61. A method of using a filter element for filtering diesel exhaust gas, comprising the steps of:

providing a filter unit as in claim 45 in an exhaust system for diesel exhaust gas; and allowing diesel exhaust gas to flow through the metal fiber fleece of the filter elements for retention of soot particles out of said diesel exhaust gas.

62. A method of using a filter element for filtering diesel exhaust gas, comprising the steps of:

providing a filter unit as in claim 52 in an exhaust system for diesel exhaust gas; and allowing diesel exhaust gas to flow through the metal fiber fleece of the filter elements for retention of soot particles out of said diesel exhaust gas.

* * * * *